(12) United States Patent
Coscarella

(10) Patent No.: US 8,640,736 B2
(45) Date of Patent: Feb. 4, 2014

(54) APPARATUS FOR PRESSURE TESTING A PLUMBING SYSTEM

(76) Inventor: Gabe Coscarella, Edmonton (CA)

( * ) Notice: Subject to any disclaimer, the term of this patent is extended or adjusted under 35 U.S.C. 154(b) by 1360 days.

(21) Appl. No.: 11/908,492

(22) PCT Filed: Mar. 21, 2006

(86) PCT No.: PCT/CA2006/000418
§ 371 (c)(1),
(2), (4) Date: Sep. 12, 2007

(87) PCT Pub. No.: WO2006/099727
PCT Pub. Date: Sep. 28, 2006

(65) Prior Publication Data
US 2009/0223583 A1 Sep. 10, 2009

(30) Foreign Application Priority Data
Mar. 21, 2005 (CA) .................................. 2501800

(51) Int. Cl.
*F16L 55/10* (2006.01)
(52) U.S. Cl.
USPC .............................. 138/90; 138/94; 138/94.3
(58) Field of Classification Search
USPC ............................................. 138/90, 94, 94.3
See application file for complete search history.

(56) References Cited

U.S. PATENT DOCUMENTS

| | | | |
|---|---|---|---|
| 2,373,242 A | 4/1945 | Glashow | |
| 3,154,106 A | 10/1964 | Ver Nooy | |
| 3,316,929 A * | 5/1967 | Milette | 137/270 |
| 3,333,814 A * | 8/1967 | Sargent | 251/203 |
| 3,442,295 A | 5/1969 | Ver Nooy | |
| 3,481,366 A * | 12/1969 | Mortonson | 137/873 |
| 3,626,475 A * | 12/1971 | Hicks | 138/94 |
| 3,891,146 A * | 6/1975 | Blazek | 138/94.3 |
| 4,040,450 A | 8/1977 | Boundy | |
| 4,602,504 A | 7/1986 | Barber | |
| 4,883,085 A * | 11/1989 | Weller et al. | 137/315.42 |
| 4,936,350 A | 6/1990 | Huber | |
| 5,004,210 A * | 4/1991 | Sarno | 251/279 |
| 5,076,095 A * | 12/1991 | Erhardt | 73/49.8 |
| 5,163,480 A | 11/1992 | Huber | |
| 5,287,730 A | 2/1994 | Condon | |
| 5,826,609 A | 10/1998 | Watts | |
| 6,024,127 A * | 2/2000 | Johnson | 137/873 |
| 6,029,684 A | 2/2000 | Watts | |
| 6,062,262 A | 5/2000 | Tash | |
| 6,082,183 A * | 7/2000 | Huber | 73/49.1 |
| 6,125,878 A | 10/2000 | Watts | |
| 6,289,935 B1 | 9/2001 | Tash | |

(Continued)

FOREIGN PATENT DOCUMENTS

CA 2339462 A1 9/2002
CA 2380194 A1 10/2002

*Primary Examiner* — James Hook
(74) *Attorney, Agent, or Firm* — Christensen O'Connor Johnson Kindness PLLC

(57) ABSTRACT

An apparatus for pressure testing a plumbing system has a hollow body defining an interior cavity. At least one interior sealing surface is provided on the body within the interior cavity, encircling one of the pipe connections. A rigid plug is provided having at least one exterior sealing surface. The plug is lowered on a shaft into the interior cavity. A plug receiver receives the plug and positions the at least one exterior sealing surface of the plug into sealing engagement with the at least one interior sealing surface.

8 Claims, 7 Drawing Sheets

(56) References Cited

U.S. PATENT DOCUMENTS

| | | |
|---|---|---|
| 6,564,823 B1 | 5/2003 | Mankins |
| 6,588,454 B1 | 7/2003 | Johnson |
| 6,655,413 B2 | 12/2003 | Condon |
| 6,672,139 B2 | 1/2004 | Pampinella |
| 6,679,283 B1 | 1/2004 | Coscarella |
| 6,997,041 B1 | 2/2006 | Metzger |
| 7,264,020 B2 | 9/2007 | Wolk |
| 7,325,573 B2 * | 2/2008 | Coscarella ............ 138/89 |
| 7,481,096 B2 * | 1/2009 | Brock ............ 73/49.8 |
| 7,731,242 B2 | 6/2010 | Coscarella |
| 2001/0015092 A1 * | 8/2001 | Pampinella ............ 73/49.8 |

* cited by examiner

APPARATUS FOR PRESSURE TESTING A PLUMBING SYSTEM

FIELD OF THE INVENTION

The present invention relates to an apparatus for pressure testing a plumbing system.

BACKGROUND OF THE INVENTION

In order to pressure test a plumbing system, a flow line is blocked and pressure is allowed to build up in the plumbing system. The conventional way of blocking the flow line is through the use of plugs or inflatable test balls.

SUMMARY OF THE INVENTION

According to the present invention there is provided an apparatus for pressure testing a plumbing system. A hollow body is provided defining an interior cavity. The body has a first pipe connection defining a first path into and out of the interior cavity and a second pipe connection defining a second path into and out of the interior cavity. There is also provided a vertically oriented third pipe connection defining a third path into and out of the interior cavity. At least one interior sealing surface is provided on the body within the interior cavity. The interior sealing surface encircles at least one of the first pipe connection or the second pipe connection. A rigid plug is provided having at least one exterior sealing surface. The plug has a shaft coupling positioned substantially perpendicular to the at least one exterior sealing surface, whereby the plug is mounted at the end of a shaft for positioning within the interior cavity of the body. A plug receiver is positioned in the interior cavity, accessible from above through the third pipe connection. The plug receiver is adapted to receive the plug and force the at least one exterior sealing surface of the plug into sealing engagement with the at least one interior sealing surface.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
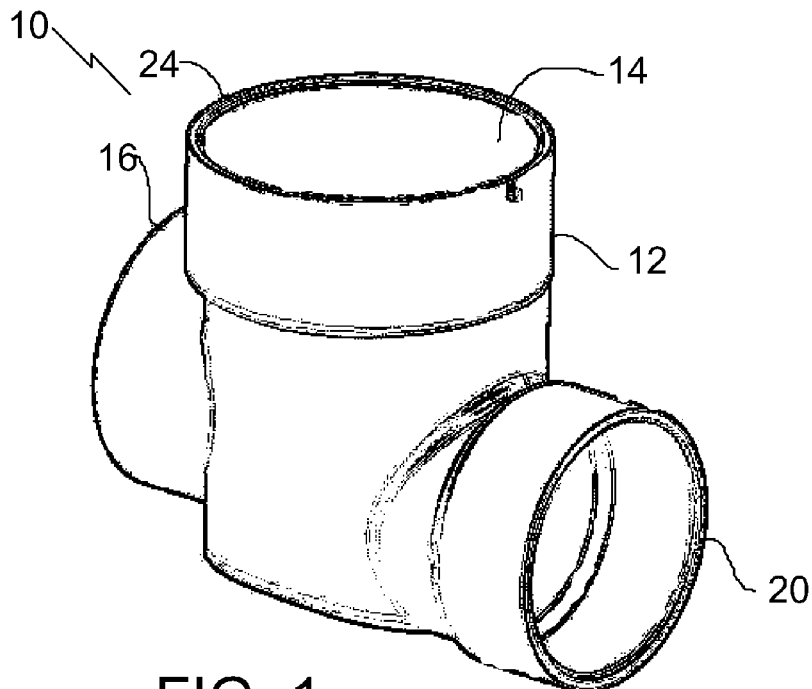
FIG. 1 is a perspective view of a first embodiment apparatus for pressure testing a plumbing system constructed in accordance with the present invention.

An apparatus for pressure testing a plumbing system will now be described. A unidirectional embodiment generally identified by reference numeral 10, will be described with reference to FIGS. 1 through 9. A bidirectional embodiment generally identified by reference numeral 100, will then be described with reference to FIGS. 10 and 11.

Figure 2:
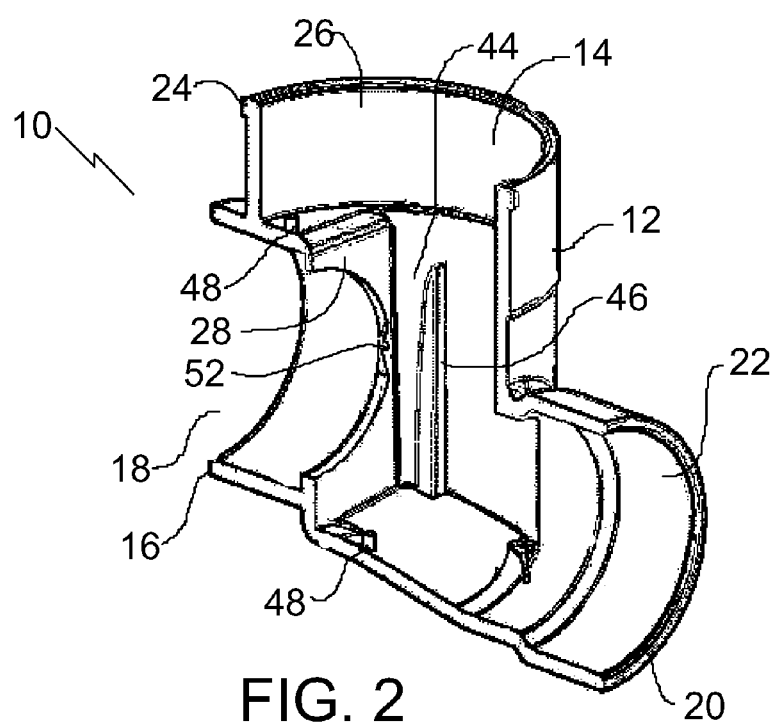
FIG. 2 is a perspective view in section of the body of apparatus for pressure testing a plumbing system without the plug installed.
Figure 3:
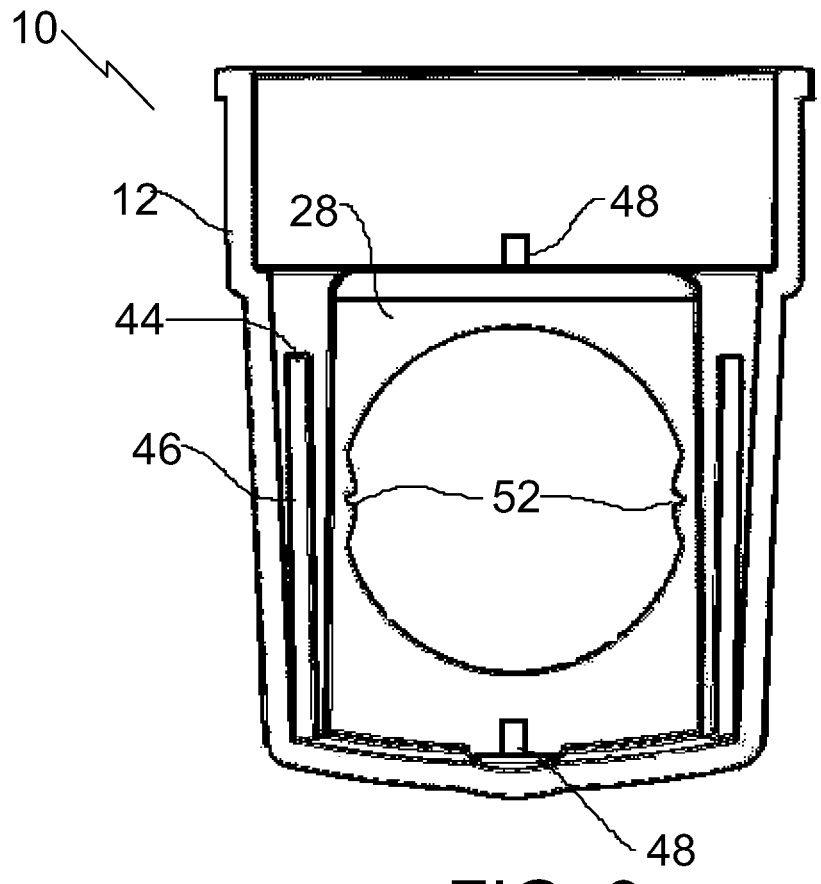
FIG. 3 is an end elevation view in section of the body of apparatus for pressure testing a plumbing system without the plug installed.
Figure 4:
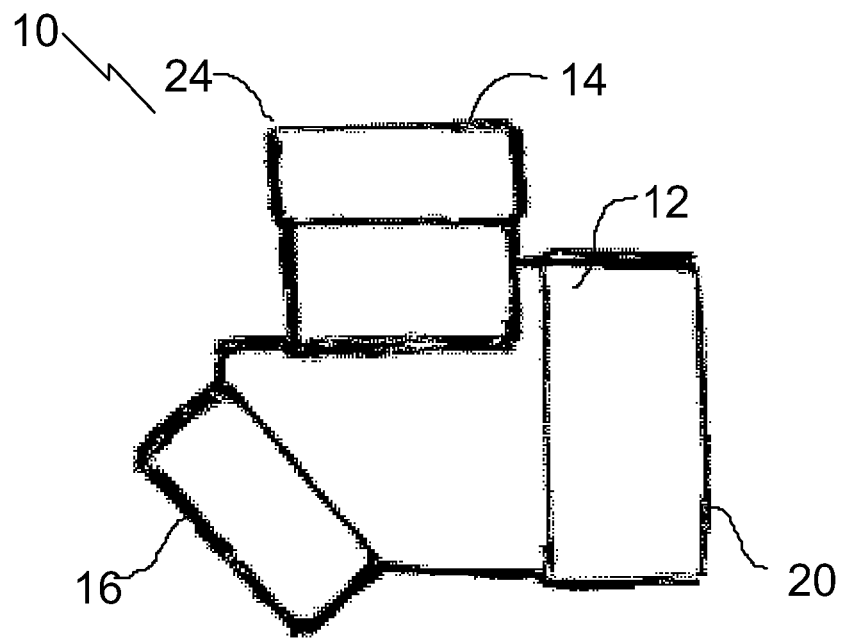
FIG. 4 is a side elevation view of a second embodiment of apparatus for pressure testing a plumbing system.

Structure and Relationship of Parts in Unidirectional Embodiment:

Referring now to FIG. 1, there is shown apparatus for pressure testing a plumbing system 10, including a hollow body 12 defining an interior cavity 14. Referring to FIG. 2, body 12 has a horizontally oriented first pipe connection 16 defining a first path 18 into and out of interior cavity 14, a horizontally oriented second pipe connection 20 defining a second path 22 into and out of interior cavity 14, and a vertically oriented third pipe connection 24 defining a third path 26 into and out of interior cavity 14. Referring to FIG. 3, there is also an interior sealing surface 28 on body 12 within interior cavity 14 that encircles first pipe connection 16. While the orientation of pipe connections 18 and 20 are shown to be horizontal, this need not be the case, as can be seen in FIG. 4, where pipe connection 18 is angled downward. It will be understood that the orientation of pipe connections 18 and 20 can be modified according to the demands of the system.

Figure 5:
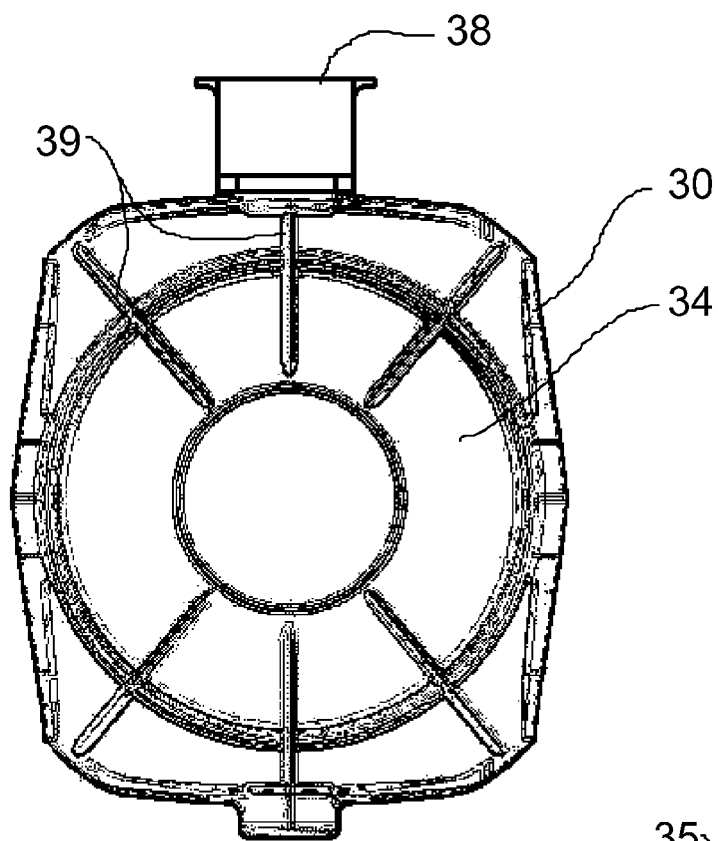
FIG. 5 is a rear plan view of the plug from the apparatus for pressure testing a plumbing system illustrated in FIG. 1.
Figure 6:
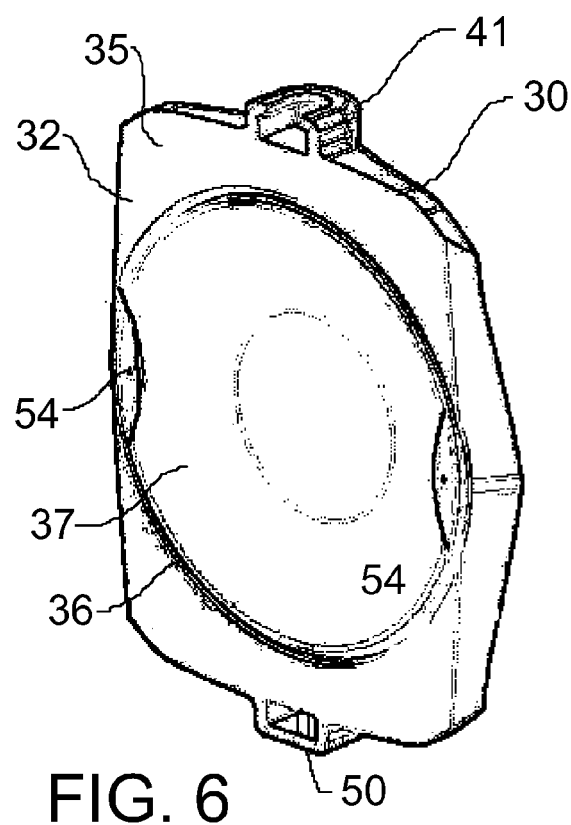
FIG. 6 is a front perspective view of the plug illustrated in FIG. 5.
Figure 7:
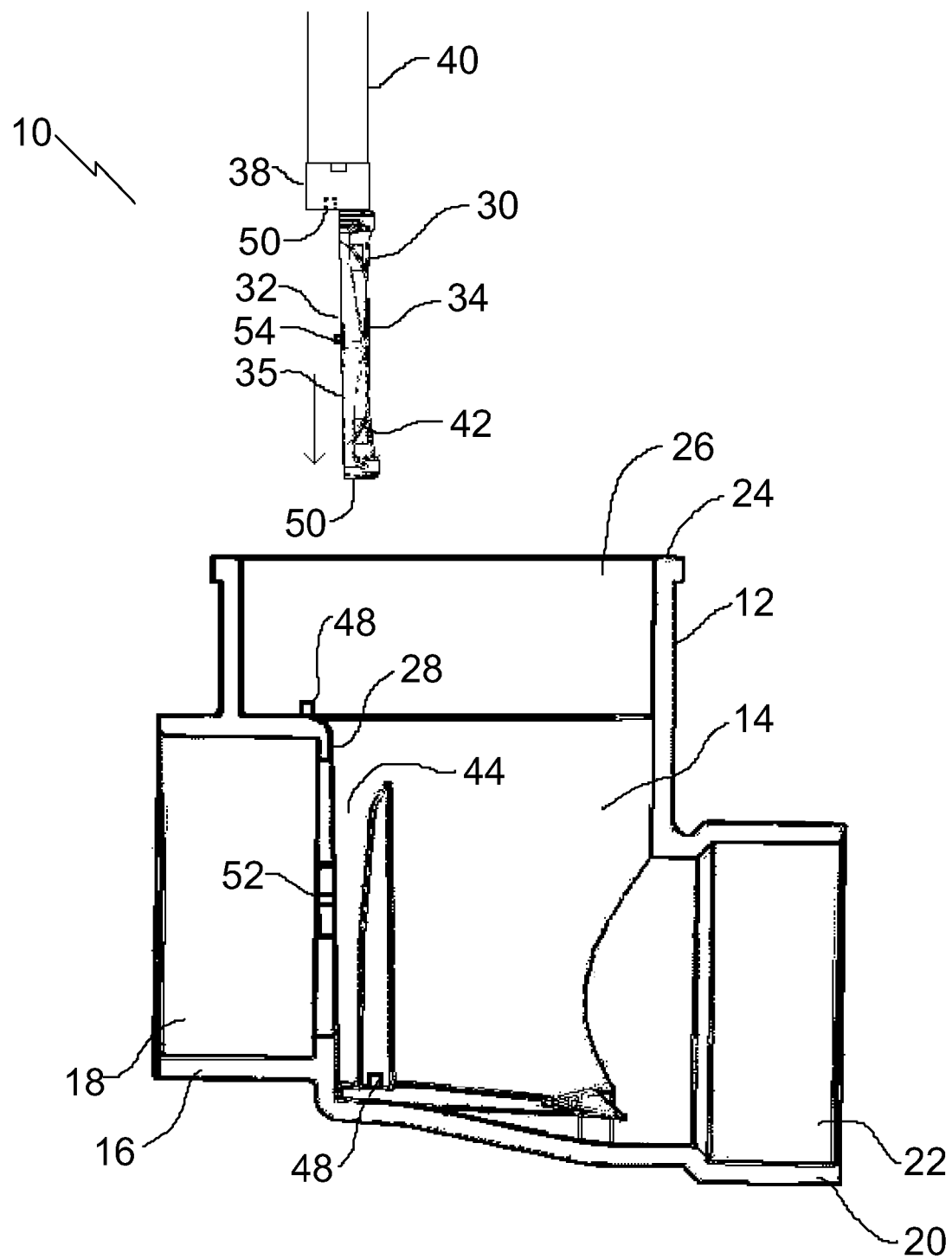
FIG. 7 is a side elevation view, in section, of the plug illustrated in FIG. 4 being installed in the body illustrated in FIG. 2.

Referring to FIGS. 5 and 6, there is shown a rigid plug 30 in the form of a plate that has a first face 32 and a second face 34. Rigid plug 30 is used to plug first path 18. First face 32 has an exterior sealing surface 35 that carries an "O" ring seal 36, and a concave surface 37 encircled by "O" ring seal 36. Second face 34 has reinforcing ribs 39 arranged radially on second face 34. Referring to FIG. 7, plug 30 also has a shaft coupling 38 positioned substantially perpendicular to exterior sealing surface 35, whereby plug 30 is mounted at the end of a shaft 40 for positioning within interior cavity 14 of body 12. Referring to FIG. 6, shaft coupling is 38 may be removable, in which case an attachment 41 is required. Referring again to FIG. 7, plug 30 has a first inclined plane engagement surface 42 on second face 34. A plug receiver 44 is positioned in interior cavity 14 accessible from above through third pipe connection 24. Plug receiver 44 has a second inclined plane engagement surface 46 such that first inclined plane engagement surface 42 and second inclined plane engagement surface 46 cooperate to wedge exterior sealing surface 35 of plug 30 into sealing engagement with interior sealing surface 28 within interior cavity 14 of body 12. As depicted, plug receiver 44 has an upwardly extending male engagement member 48 above and below interior sealing surface 28 and plug 30 has corresponding downwardly extending female receptacle 50 adapted to mate with male engagement member 48. It will be understood that more engagement members 48 and receptacles 50 may be present. In addition, the sides of interior sealing surface 28 have a female locking engagement 52 and the sides of plug 30 have a corresponding male locking engagement 54 for locking gate 30 into place.

Figure 8:
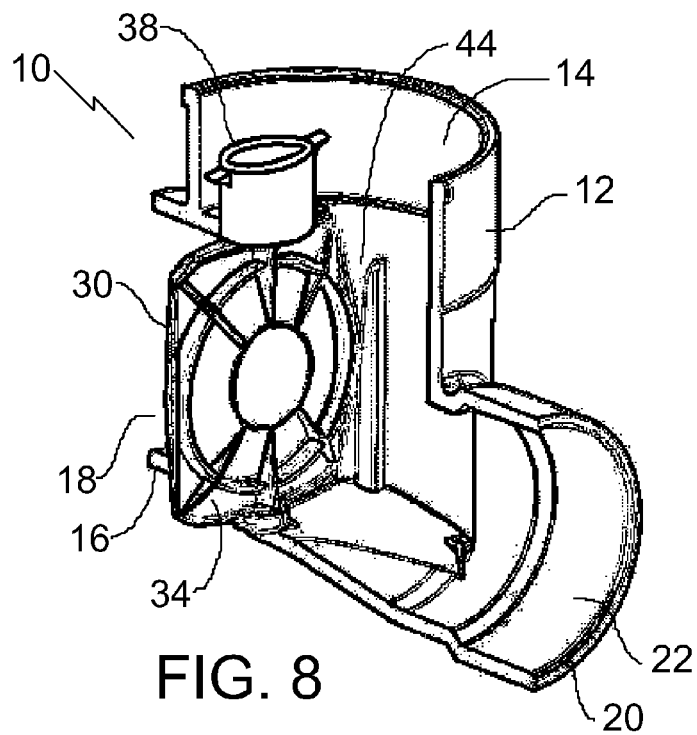
FIG. 8 is a perspective view in section of the plug illustrated in FIG. 4 installed in the body illustrated in FIG. 2.
Figure 9:
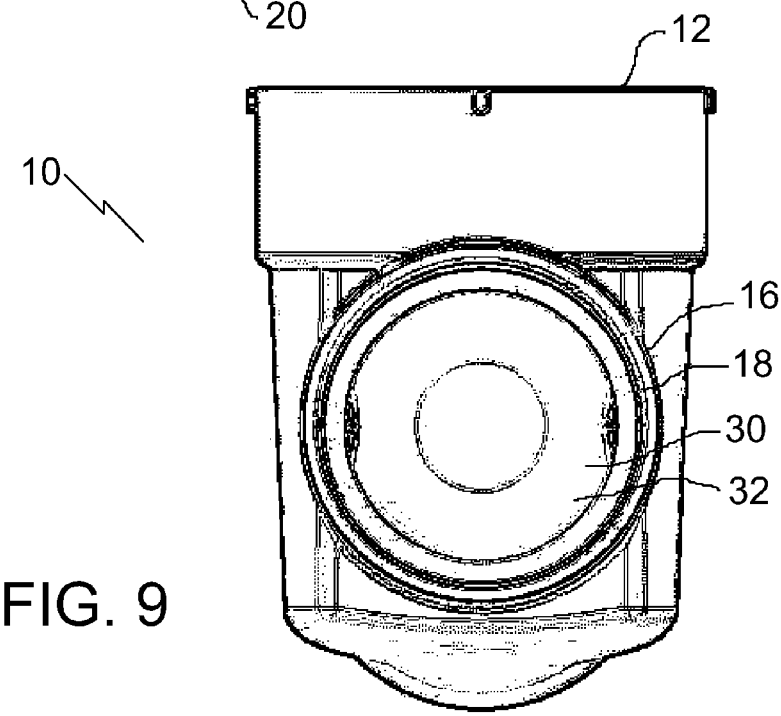
FIG. 9 is a front elevation view of the plug illustrated in FIG. 4 installed in the body illustrated in FIG. 2.

Operation of Unidirectional Embodiment:

The use and operation of apparatus for pressure testing a plumbing system 10 will now be discussed with reference to FIGS. 1 through 9. Referring now to FIG. 7, there is shown plug 30 being installed in interior cavity 14 of body 12 through third path 26. Shaft 40 is connected to shaft coupling 38 to allow the user to position plug 30 from the outside. Referring now to FIG. 8, plug 30 is received by plug receiver 44. As plug 30 is inserted into plug receiver 44, first inclined engagement surface 42 on second face 34 of plug 30 engages second inclined engagement surface 46 of plug receiver 44. As plug 30 is pushed further down, O-ring seal 36 is sealed against interior sealing surface 28. Concave surface 37 on first face 32 and reinforcing ribs 39 on second face prevent gate 30 from warping under pressure. Plug 30 is held in place on each of its four sides. Referring to FIG. 7, on the top and bottom, plug 30 has female receptacles 50 that receive male adaptors 48, and, referring to FIG. 3, plug receiver 44 is adapted to hold plug 30 against interior sealing surface 28. In addition, referring again to FIG. 7, plug 30 is kept from sliding back out of plug receiver 44 by female locking engagements 52 on the sides of interior sealing surface 28 and corresponding male locking engagements 54 on plug 30.

Figure 10:
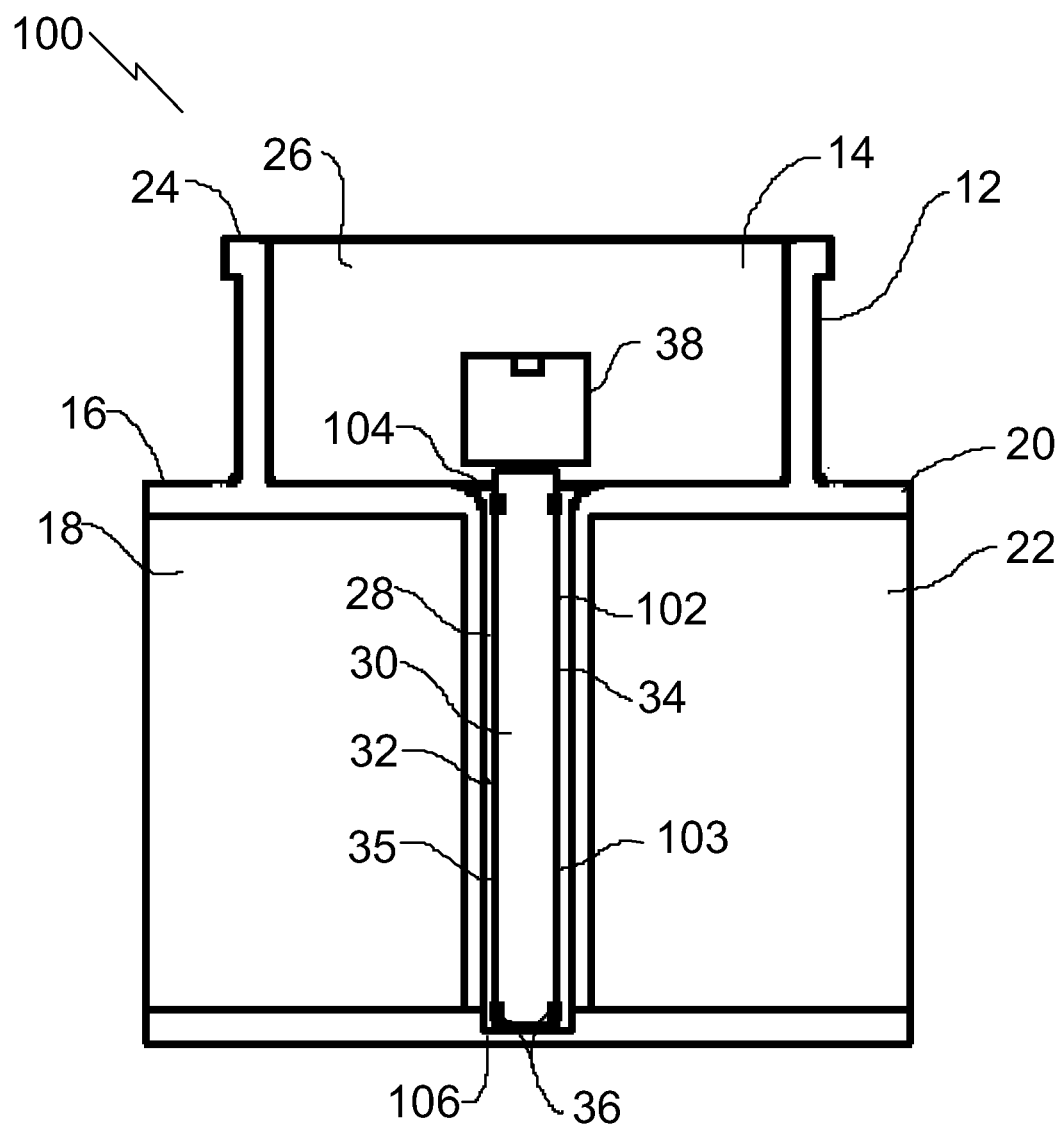
FIG. 10 is a side plan view in section of a third embodiment of the apparatus for pressure testing a plumbing system.

Structure and Relationship of Parts in Bidirectional Embodiment:

Referring now to FIG. 10, bidirectional embodiment 100 is shown. This embodiment also includes hollow body 12, interior cavity 14, and first, second, and third pipe connections 16, 20, and 224, respectively. First pipe connection 16 also has first interior sealing surface 28 on body 12 within interior cavity 14 encircling first pipe connection 16, and second pipe connection 20 has a second interior sealing surface 102 encircling second pipe connection 20.

Figure 11:
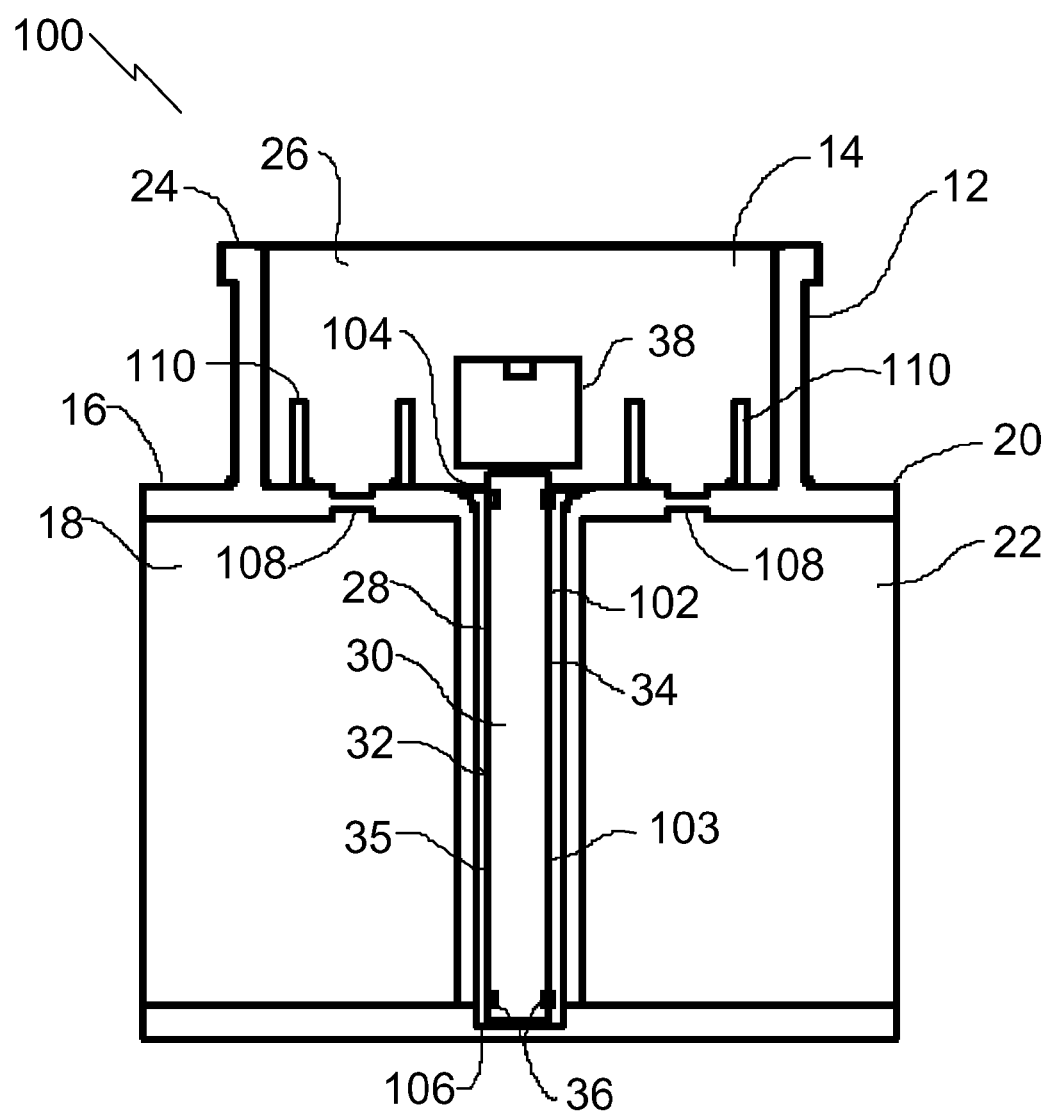
FIG. 11 is a side plan view in section of a fourth embodiment of the apparatus for pressure testing a plumbing system.

In this embodiment, rigid plug 30 as described above is also used, however, as depicted, each of the first face 32 and second face 34 has an exterior sealing surface 35 that carries an "O" ring seal 36. There is a plug receiver 104 positioned in interior cavity 14 accessible from above through third pipe connection 24. Plug receiver 104 defines a slot 106 into which plug 30 is received, thereby forcing exterior sealing surface 35 on first face 32 of plug 30 into sealing engagement with first interior sealing surface 28 and exterior sealing surface 103 on second face 34 of plug 30 into sealing engagement with second interior sealing surface 102. The seal is made stronger as pressure is applied from either first pipe connection 16 or second pipe connection 20, such that plug 30 is pushed up against the opposite sealing surface 28 or 102. For example, if pressure is applied from first pipe connection 16, plug 30 will seal against second sealing surface 102. Since third pipe connection 24 will have been sealed after plug 30 was properly positioned, the applied pressure will have nowhere to go. This allows body 12 to act as a seal when pressure is applied from either direction. Referring to FIG. 11, an additional feature may include frangible walls 108 that, when pierced or otherwise opened, allows the user to connect to a fill port 110 to supply fluid to either side of plug 30.

The second embodiment may be designed such that plug 30 fits tightly into plug receiver 104, such that a seal is created once it is installed, or alternatively, it may fit loosely within plug receiver 104, such that the seal is formed when pressure is applied. The advantage of the first option is that fluid does not enter the third path 26, whereas the second option allows plug 30 to be installed more easily.

Operation of Bidirectional Embodiment:

The use and operation of the bidirectional embodiment 100 will now be discussed with reference to FIG. 10. The overall structure is similar to the first embodiment. Plug 30 is installed into slot 106 in plug receiver 104, thereby forcing exterior sealing surface 35 on first face 32 of plug 30 into sealing engagement with first interior sealing surface 28 and exterior sealing surface 103 on second face 34 of plug 30 into sealing engagement with second interior sealing surface 102. However, once pressure is applied from either direction (which may be done through fill port 110 by piercing frangible wall 108, as shown in FIG. 11), plug 30 is pushed against the opposite sealing surface 28 or 102 and a seal is formed by O-ring seal 36. For example, if pressure is applied form second path 22, the pressure will cause O-ring seal 36 on first face 32 of plug 30 to seal against sealing surface 28. Alternatively, only one side of plug 30 may have an O-ring seal 36, in which case a further locking mechanism would be needed to keep plug 30 stable in slot 106.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. An apparatus for pressure testing a plumbing system, comprising:
    a hollow body defining an interior cavity, the body having a first pipe connection defining a first path into and out of the interior cavity and a second pipe connection defining a second path into and out of the interior cavity, and a vertically oriented third pipe connection defining a third path into and out of the interior cavity;
    an interior sealing surface on the body within the interior cavity, the interior sealing surface encircling the first pipe connection;
    a rigid plug having an exterior sealing surface;
    a plug receiver carried by the hollow body within the interior cavity and accessible from above through the third pipe connection, the plug receiver comprising an open-topped slot that receives the plug and forces the exterior sealing surface of the plug into sealing engagement with the interior sealing surface such that the second pipe connection remains in fluid communication with the third pipe connection; and
    means for pulling the plug out of engagement with the plug receiver;
    wherein the plug has a first inclined plane engagement surface and the plug receiver has a second inclined plane engagement surface, the first inclined plane engagement surface and the second inclined plane engagement surface cooperating to wedge the exterior sealing surface of the plug into sealing engagement with the interior sealing surface within the interior cavity of the body.

2. An apparatus for pressure testing a plumbing system, comprising:
    a hollow body defining an interior cavity, the body having a first pipe connection defining a first path into and out of the interior cavity and a second pipe connection defining a second path into and out of the interior cavity, and a vertically oriented third pipe connection defining a third path into and out of the interior cavity;
    an interior sealing surface on the body within the interior cavity, the interior sealing surface encircling the first pipe connection;

a rigid plug in the form of a plate having a first face and a second face, the first face having an exterior sealing surface that carries an "O" ring seal, the plug having a shaft coupling positioned substantially perpendicular to the exterior sealing surface, whereby the plug is mounted at the end of a shaft for positioning within the interior cavity of the body, the plug having a first inclined plane engagement surface on the second face;

a plug receiver carried by the hollow body within the interior cavity and accessible from above through the third pipe connection, the plug receiver having a second inclined plane engagement surface, the first inclined plane engagement surface and the second inclined plane engagement surface cooperating to wedge the exterior sealing surface of the plug into sealing engagement with the interior sealing surface within the interior cavity of the body such that the second and third pipe connections are in fluid communication.

3. The apparatus as defined in claim 1, wherein the first face of the plate has a concave surface encircled by the "O" ring seal.

4. The apparatus as defined in claim 2, wherein the second face has reinforcing ribs.

5. The apparatus as defined in claim 4, wherein the reinforcing ribs are arranged radially on the second face.

6. The apparatus as defined in claim 2, wherein the plug receiver has at least one upwardly extending male engagement member and the plug has at least one downwardly extending female receptacle adapted to mate with the at least one male engagement member.

7. The apparatus as defined in claim 2, wherein the plug receiver is integrally formed with the hollow body.

8. The apparatus as defined in claim 2, wherein the plug receiver comprises an open-topped slot that receives the plug.

* * * * *

UNITED STATES PATENT AND TRADEMARK OFFICE
CERTIFICATE OF CORRECTION

PATENT NO. : 8,640,736 B2  
APPLICATION NO. : 11/908492  
DATED : February 4, 2014  
INVENTOR(S) : G. Coscarella Page 1 of 1

It is certified that error appears in the above-identified patent and that said Letters Patent is hereby corrected as shown below:

On the title page item (30)

Foreign Application Priority Data — Before the line beginning with "[51] Int. Cl." please insert: --Apr. 27, 2005   (CA)   2505798--

Signed and Sealed this  
Twenty-second Day of December, 2015

Michelle K. Lee  
*Director of the United States Patent and Trademark Office*